(12) United States Patent
Groenninger et al.

(10) Patent No.: US 9,114,744 B2
(45) Date of Patent: Aug. 25, 2015

(54) LATCHABLE HEADREST

(71) Applicants: Reinhold Groenninger, Maxhuette-Haidhof (DE); Thomas Wallinger, Bodenwoehr (DE)

(72) Inventors: Reinhold Groenninger, Maxhuette-Haidhof (DE); Thomas Wallinger, Bodenwoehr (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/268,402

(22) Filed: May 2, 2014

(65) Prior Publication Data
US 2014/0327288 A1 Nov. 6, 2014

(30) Foreign Application Priority Data
May 6, 2013 (DE) .......................... 10 2013 007 633

(51) Int. Cl.
*B60N 2/48* (2006.01)

(52) U.S. Cl.
CPC ............ *B60N 2/4811* (2013.01); *B60N 2/4805* (2013.01); *B60N 2/4814* (2013.01); *B60N 2/4817* (2013.01); *B60N 2002/4888* (2013.01)

(58) Field of Classification Search
CPC .. B60N 2/4817; B60N 2/4814; B60N 2/4808; B60N 2/4811; B60N 2002/4888; B60N 2/4805
USPC .......................................................... 297/410
See application file for complete search history.

(56) References Cited

U.S. PATENT DOCUMENTS

| 3,563,602 | A | * | 2/1971 | Ohta et al. | 297/410 |
| 4,830,434 | A | * | 5/1989 | Ishida et al. | 297/408 |
| 2010/0270842 | A1 | * | 10/2010 | Mueller et al. | 297/410 |
| 2011/0291456 | A1 | * | 12/2011 | Poehlmann et al. | 297/410 |
| 2012/0161490 | A1 | * | 6/2012 | Poehlmann et al. | 297/410 |
| 2012/0235460 | A1 | * | 9/2012 | Fey et al. | 297/410 |

FOREIGN PATENT DOCUMENTS

| DE | 102006061638 A | 7/2008 |
| EP | 0970846 A | 1/2000 |
| WO | WO 2004082987 A1 * | 9/2004 |

* cited by examiner

*Primary Examiner* — Milton Nelson, Jr.
(74) *Attorney, Agent, or Firm* — Andrew Wilford

(57) ABSTRACT

A vehicle headrest has at least one generally vertical support rod formed with a vertical row of horizontally open notches, a body vertically slidable along the rod, and a latch element shiftable in the body between a first position engaged in one of the notches and impeding sliding of the body along the rod, a second position offset in one direction from the rod, and a third position offset in another direction from the rod. The latch element travels in a first straight line from the first position to the second position and in a second straight line nonparallel to the first straight line from the first position to the third position.

20 Claims, 10 Drawing Sheets

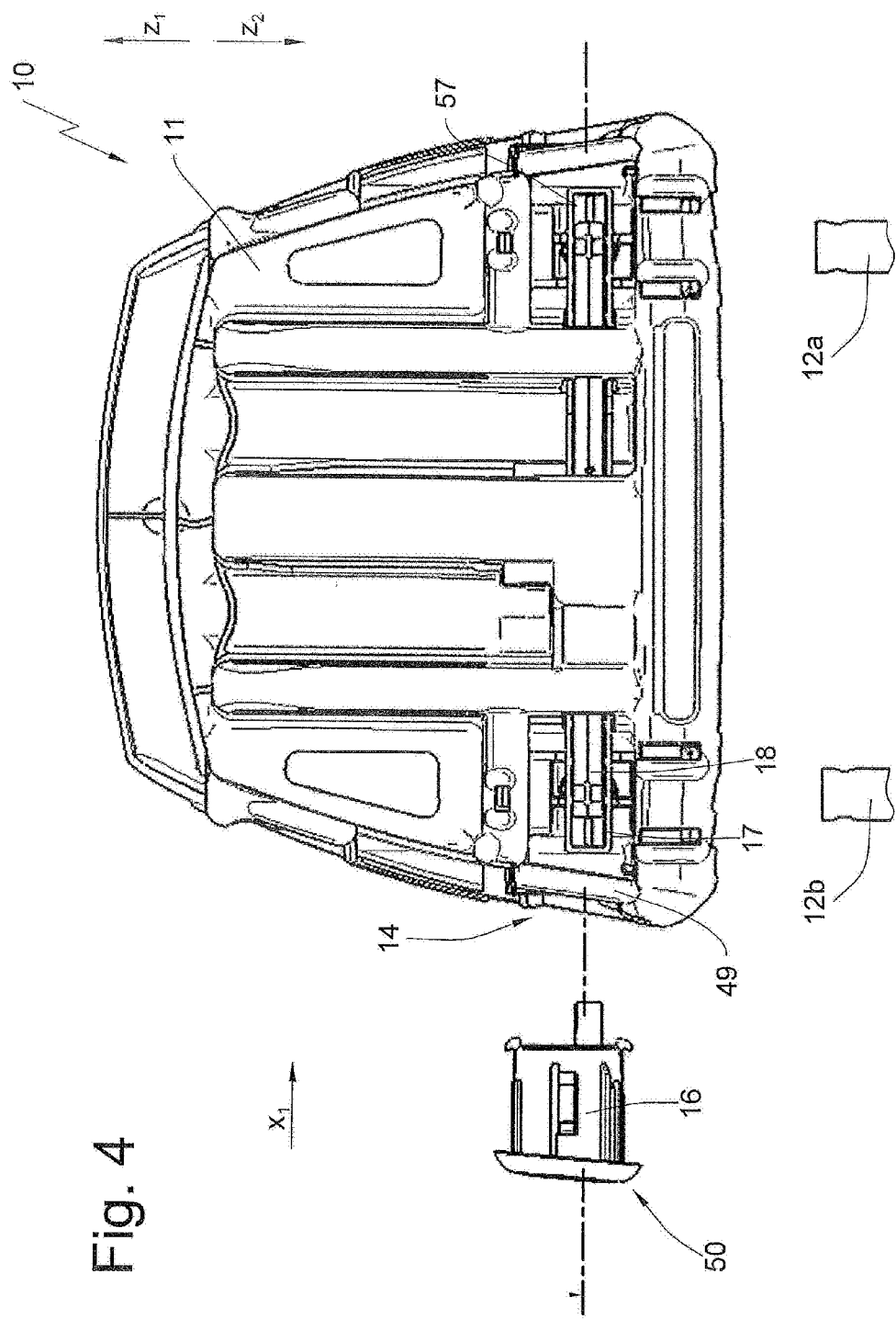

LATCHABLE HEADREST

The invention relates primarily to a headrest. The headrest comprises a body that has a head contact surface, at least a support rod or a support rod bracket and a mount for holding the body by at least a support rod. In addition, the headrest has a latch by means of which a relative movement of the body relative to the support rod or a relative movement of the support rod relative to the vehicle seat can be releasably locked.

Such a headrest is known from EP 0 970 846 A1. The headrest has a latch with a slide 15 that can be moved against a spring force out of the locking position. When actuating the slide in a direct direction, locking regions 28 of locking wires 22 are moved out of the notches of the support rod so that a height adjustment is possible. When the slide is moved further from the lock position, teeth 18 disengage from openings 14 of a guide part 11 in which the slide 15 is guided. A tilting adjustment can then be made.

Such prior-art headrests could be displaced, depending on the shape of the notch, for example in the direction of extension without unlocking the latch, while an adjustment in the insertion direction was only possible by unlocking the latch.

If the headrest was extended very far out and the backrest of a seat was tilted back, the problem existed that the headrest bumped against the vehicle roof. As a result, the vehicle roof or the headrest could sustain damage because the headrest did not give way when colliding with the roof liner due to the rigid locking in the retraction direction.

It is the object of the invention to create a headrest that offers a high level of safety and ensures a high level of functional reliability. In addition, the headrest is to be configured in such a manner that a collision of the headrest with other vehicle parts does not result in damage of these vehicle parts or the headrest.

The object is attained by a headrest with the features of claim 1.

The headrest according to the invention comprises a body that can be mounted with at least one support rod on the vehicle seat. On the body, a cushion support for example is held, on which a cushion is attached. The support rod according to the invention may also be a support rod bracket for example.

The headrest is secured in at least one mount. The mount can support the body on the support rod or can support the support rod in a vehicle seat.

The headrest comprises at least one latch that releasably allows relative movement of the support rod and the mount. The latch has at least one notch that is formed in the support rod and at least one latch bar carried on the vehicle seat or on the body.

The latch bar can be moved between a first position and a second position. The latch bar is connected for example to an actuator.

By pressing on the actuator, the latch bar can be moved into the second position in which the latch bar is out of engagement with the notch. In the first position, the latch bar is engaged with the notch.

The latch bar can also be moved between the first and a third position. In the third position, the latch bar is out of engagement with the notch. The movement of the latch bar between the first and the third position takes place depending on contact of the latch bar with the support rod surface.

According to a first embodiment, movement of the latch bar between the first and second position takes place along a first movement path. This movement is for example straight-line travel, arcuate travel, rotation, or a combination of at least two of the above-described movement types. The mount allows for example a movement of the latch bar along a first axis. The movement of the latch bar between the first position and the second position on the first movement path occurs for example by operation of the actuator.

According to another embodiment, the latch bar can be moved along a second movement path between the first and a third position. In the third position, the latch bar is out of engagement with the notch, for example regardless of whether the actuator is actuated or not. This movement, too, pertains for example to straight-line travel, arcuate movement, rotation, or a combined movement with portions of at least two of the above-described movement types. The movement on the second movement path between the first position and the third position occurs for example by latch bar contacting the notch surface.

According to another embodiment of the invention, the latch bar is on a slide. For example, the latch bar is attached to the slide or integrally formed with the slide. In this case for example, the slide can be moved between a rest position and a freeing position. The rest position corresponds for example to the first position of the latch bar and the freeing position corresponds to the second position of the latch bar. The slide can be moved for example by the actuator between the rest position and the freeing position.

According to another embodiment, the slide is in a housing. The first movement path can for example be defined by first guides on the housing and by second guides on the slide. The housing is for example moveable between a rest position and a freeing position. The rest position corresponds for example to the first position or the second position of the latch bar and the freeing position corresponds to the third position of the latch bar. The second movement path is for example determined by first guides on the body and second guides on the housing.

The latch bar is for example biased by at least a first return element into the first position. For example, the slide is biased by the first return element into the rest position. The return element is supported for example on the housing and on the slide.

According to an embodiment of the invention, the latch bar is biased by at least a second return element into the first position. For example, the second return element places a load on the housing in the rest position.

The housing has for example at least a first contact surface that can be engaged with a second contact surface of the mount to define the rest position and the first position and/or the freeing position and the third position. The second contact surface is formed by the body. For example, the housing is biased by at least one return element against the body so that the contact surfaces of the housing are in releasable contact with the contact surfaces of the body.

According to another embodiment, the notch has at least a blocking flank that extends approximately at a right angle to the center axis of the support rod. When the latch bar contacts the blocking flank of the notch, another movement of the body of the headrest is prevented by the blocking flank if the slide is in the rest position. A displacement of the body is only possible by a displacement of the slide into the freeing position. The housing does not move out of the rest position through the contact with the blocking flank.

According to an embodiment of the invention, the notch has at least a control flank that forms an angle between 20 and 80° to the center axis. If the latch bar comes in contact with the control flank, a force is transmitted to the housing, which places a load on the housing in the third position, in which the latch bar is not engaged with the notch. Through contact of the latch bar with the control flank, the latch bar is thus automatically moved out of the notch. A displacement of the actuator is not necessary. The force that is necessary to move the latch bar out of the notch and is thus required to displace the body depends on the angle that the control flank forms with the center axis.

For example, the latch bar is moved between the first and third position (such an unlocking is hereinafter referred to as passive unlocking) when the latch bar comes in contact with a control flank of the notch by movement of the body. In this case, a force is exerted on the latch bar that biases the latch bar into the third position. Thus, one must overcome the biasing force of the latch bar when engaged in the notch.

When the latch bar comes in contact with a blocking flank of the notch by a movement of the body, an additional movement of the body is possible only when an active unlocking occurs, i.e. when the latch bar is moved from the first into the second position.

Thus, if a notch has two blocking flanks, the body can, when the latch bar is engaged with such a notch, only be moved up or down if active unlocking occurs. If the notch has two control flanks, the body can be moved in both directions by a passive unlocking. If the notch has a blocking flank as well as a control flank, a movement of the body parallel to the blocking flank can only occur by active unlocking; however, a movement parallel to the control flank can also occur by passive unlocking.

According to a second aspect, the invention also pertains to a vehicle seat with a headrest.

It is an object of the invention to create a vehicle seat with a headrest in which the headrest is improved in terms of safety and functional reliability.

This object is attained by a vehicle seat with a headrest according to claim 11.

In regard to the advantages, reference is made to the stated advantages and explanations concerning the first aspect of the invention.

Additional advantages emerge from an embodiment shown in the drawings.

FIG. 4 shows a rear view of the headrest in a partially exploded view.

A headrest is shown at 10 in the drawings. The same reference signs in the various drawings also refer to corresponding parts when letters are added or omitted.

Figure 1:
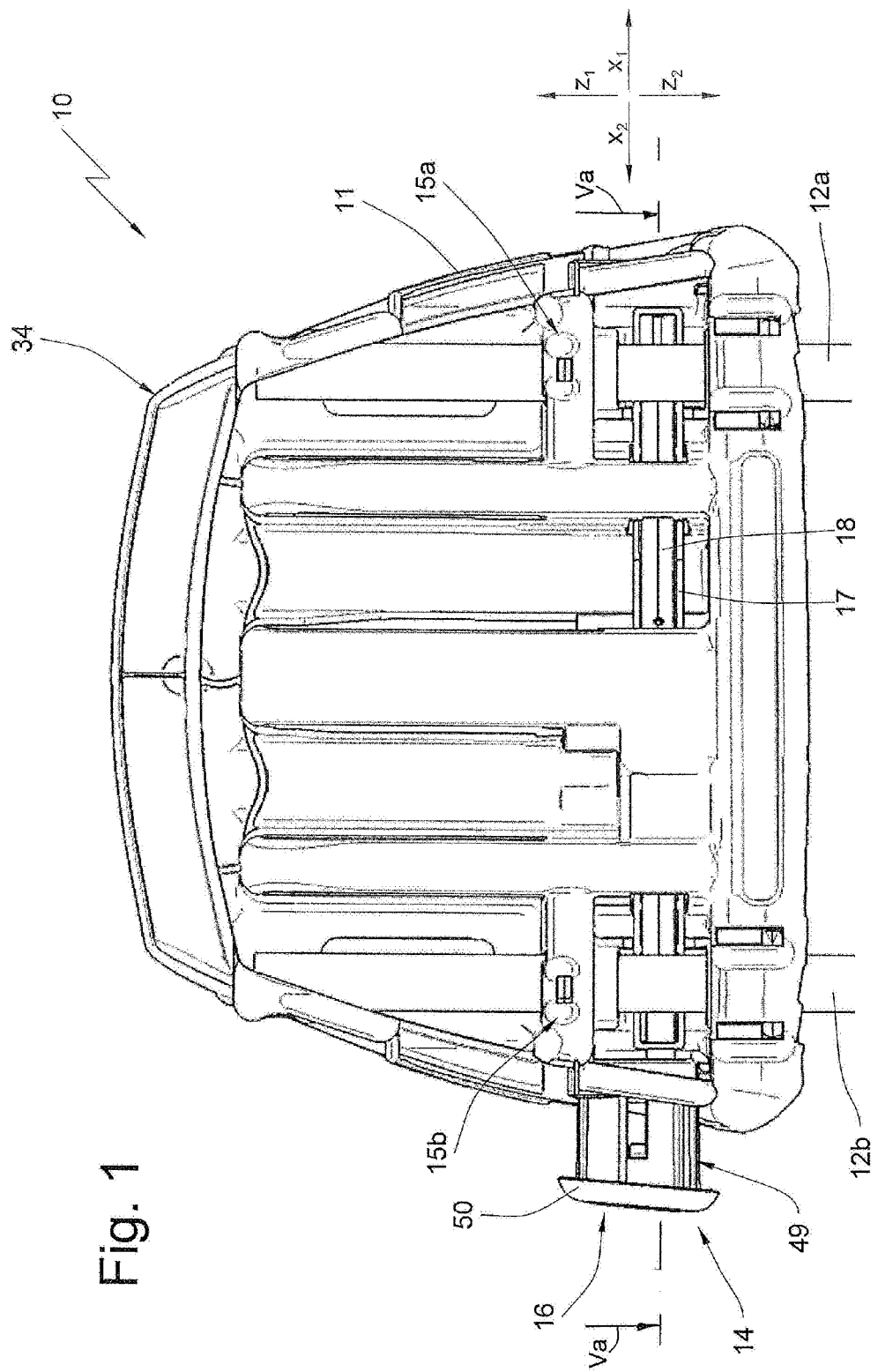
FIG. 1 is a schematically rear view of the headrest.

The headrest 10 comprises a body 11 and support rods 12a and 12b. The body 11 can be mounted by supports rods 12a and 12b in an unillustrated vehicle seat. In FIG. 1, one can see that mounts 15a and 15b are formed on the body 11. The mounts 15a 15b form guides in which the support rods 12a and 12b are seated. In addition, mounts are attached in a known manner in the backrest of the unillustrated vehicle seat to enable the support rods 12a and 12b to be mounted in the backrest.

A cushion support 34 with a head contact surface is carried on the body 11. The head contact surface 13 is indicated only by a dashed line. The head contact surface 13 forms a support structure for the head of the occupant, if the head is accelerated rearward against the headrest, for example in the an accident. The head contact surface 13 is directed in a driving direction $y_2$ [$y_1$].

The body 11 is moveable in directions $z_1$, $z_2$ relative to the support rods 12a and 12b. A latch assembly 14 releasably allows relative movement between the body 11 and the support rods 12a and 12b. The latch assembly 14 comprises an actuator 16, a housing 17 as well as a slide 18. The housing 17 is mounted on the body 11 and is moveable in the directions $y_1$, $y_2$ relative to the body 11. The slide 18 is mounted on the housing 17 and can be moved in the direction $x_1$, $x_2$ relative to the housing 17. The z-axis of movement directions $z_1$, $z_2$, the x-axis of movement directions $x_1$, $x_2$, and the y-axis of movement directions $y_1$, $y_2$ are perpendicular to each other.

Figure 2:
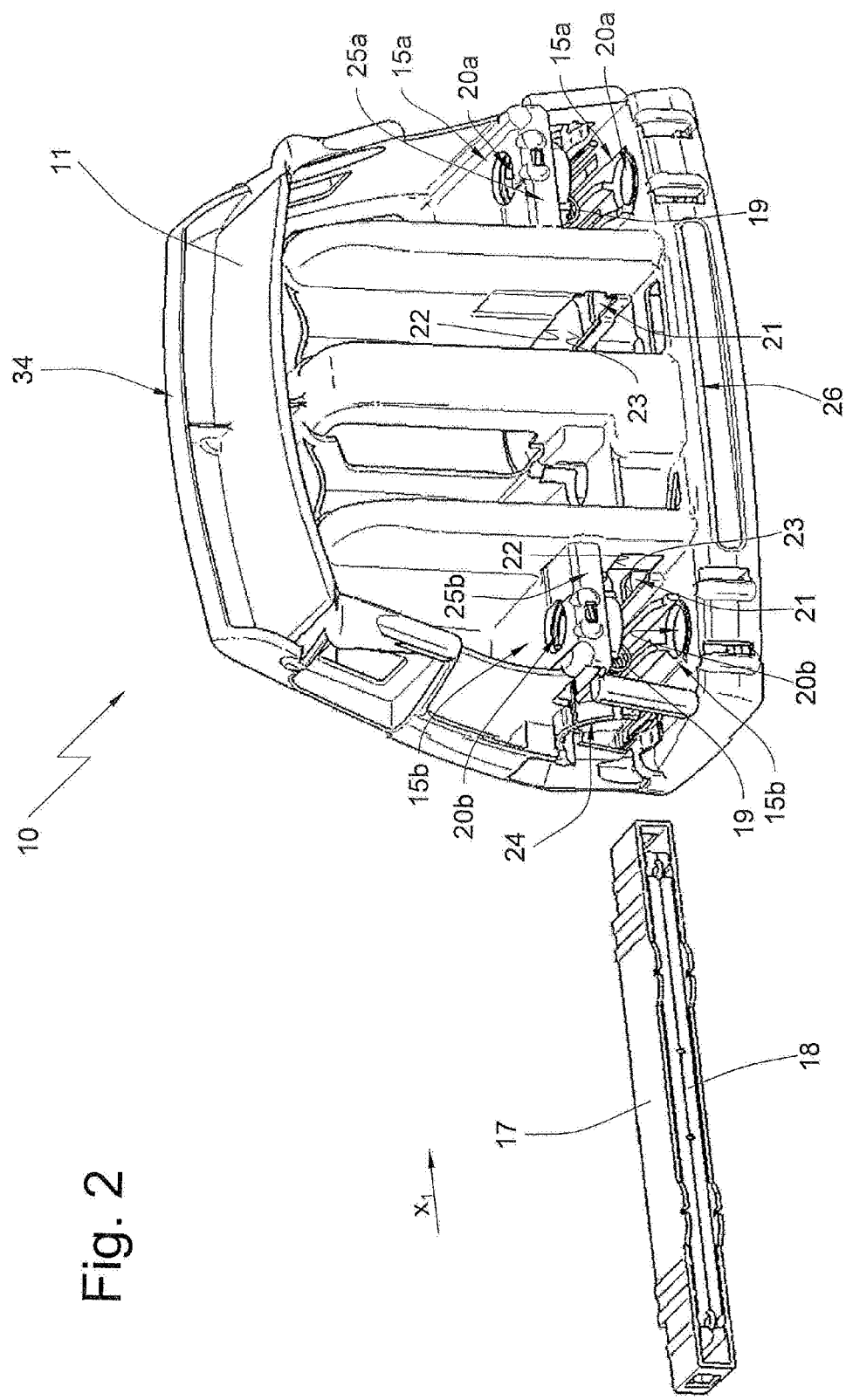
FIG. 2 is a schematic perspective rear view of the body of the headrest as well as the housing with a slide in a partially exploded view.

FIG. 2 shows the body 11 and the housing 17 in an exploded view. The latch assembly 14 has springs 19 that braced against the housing 17 in direction $y_1$ parallel to the support rods 12a and 12b. In FIG. 2, one can see the mounts 15a and 15b as well as guides 20a and 20b formed in upper cross-pieces 25a and 25b as well as in a lower cross-piece 26 of the body 11. The body 11 forms a support seat 21 for the housing 17. Upper and lower wall regions 22 and 23 of the support seat 21 form guide tracks the housing 17. A support seat 24 is provided in the body 11 for the actuator 16.

Figure 3:
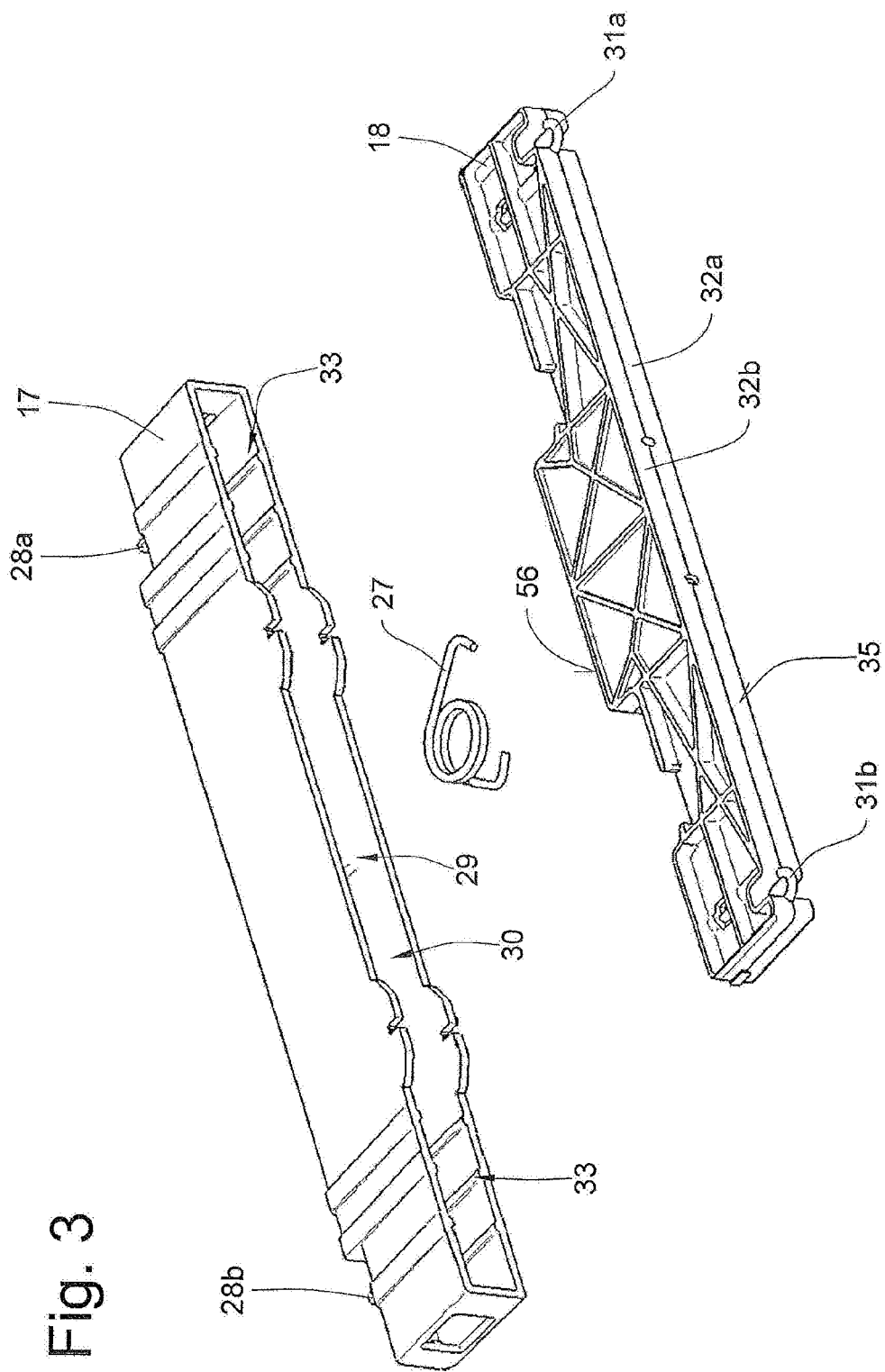
FIG. 3 shows a schematic perspective view of the housing and the slide in an exploded view.

FIG. 3 shows the housing 17 and the slide 18 in an exploded view. In addition, a spring 27 is shown that is held on the housing 17 and braced against the slide 18 in the rest position. Guide pins 28a and 28b are formed on the housing 17 and form support seats for springs 19. The housing 17 is hollow and forms a cavity 20 for the slide 18 that is accessible via an opening 30. The housing has ribs 33 for guiding the slide 18 and that are provided to prevent friction when moving the slide 18.

In FIG. 3, one can see that the slide 18 is composed of two slide plates 32a and 32b. The slide 18 has latch bars 31a and 31b that are attached to the slide plates 32a and 32b. A spring 27 and the latch bars 31a and 31b are gripped between the slide plates 32a and 32b. The latch bars 31a and 31b are formed by U-shaped wires. While the free ends of each U-shaped wire are held between the slide plates 32a and 32b, bight portions of the U-shaped wire of latch bar 31a as well as latch bar 31b project past an edge face 35 of the slide 18.

The latch assembly 14 is assembled according to FIG. 2 the housing 17 by setting the slide 18 in the seat 21 in the direction $x_1$. Then according to FIG. 4, the actuator 16 is installed in the seat 24 and the support rods 12a and 12b are placed in the guides 20a and 20b of the mounts 15a and 15b in the direction $z_1$ and secured to the body 11.

Figure 5A:
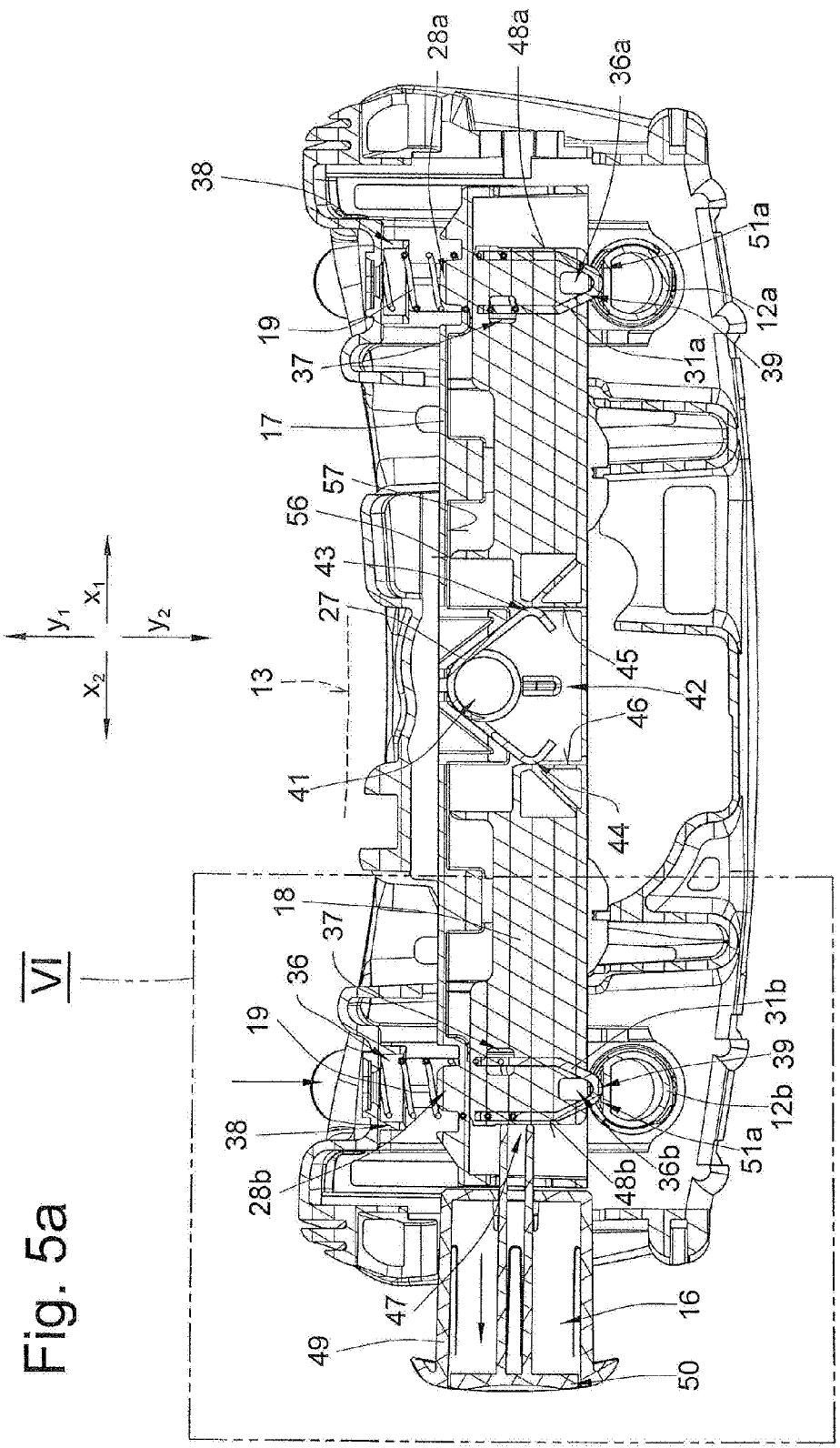
FIG. 5a is a schematic section according to section plane Va-Va in FIG. 1 with the housing in the rest position.

In FIG. 5a, one can see that the body 11 forms for each spring 19 a holding bushing 38 in which an end of the spring 19 is held. Another end of the spring 19 is positioned on a guide pin 28a or 28b.

The slide 18 is formed with projections 36a, 36b against which contact regions 39 of the latch bar 31a or 31b.

In the present embodiment, the projections 36a, 36b are shaped complimentarily to the contact region 39. Recesses 37 are also constructed to secure the latch bar 31 in the slide 18.

A region 41 of the spring 27 is attached to the housing 17 and a region 42 of the spring 27 is accommodated between the slide plates 32a and 32b. The spring 27 has two free ends 43 and 44 that are positioned at an acute angle β to each other. β is for example about 90°. The ends 43 and 44 rest slide faces 45 and 46.

The actuator 16 has a housing 49 and a button 50 that is fixed to an actuating extension 47. The actuating extension 47 is in contact with an actuating face 48b of the slide 18. On actuation of the button 50, the actuation extension 47 is moved in the direction $x_1$ so the slide 18 is moved in the direction $x_1$ against the spring force of the spring 27.

In FIG. 5a, one can see that, in the rest position, the slide 18 is centered in the housing 17 and can be moved both in the direction $x_1$ as well as in the direction $x_2$. As a result of on this symmetry, it is possible for example to construct the headrests of vehicle seats next to each other in a mirror-image manner, so that the actuator is on different sides of the headrest 10. As an alternative to the shown variants, the actuator 16 could also interact with an actuation face 48a of the slide 18.

According to another variant, the actuation face 48a and the actuating face 48b could each interact with a respective actuator 16.

Figure 5B:
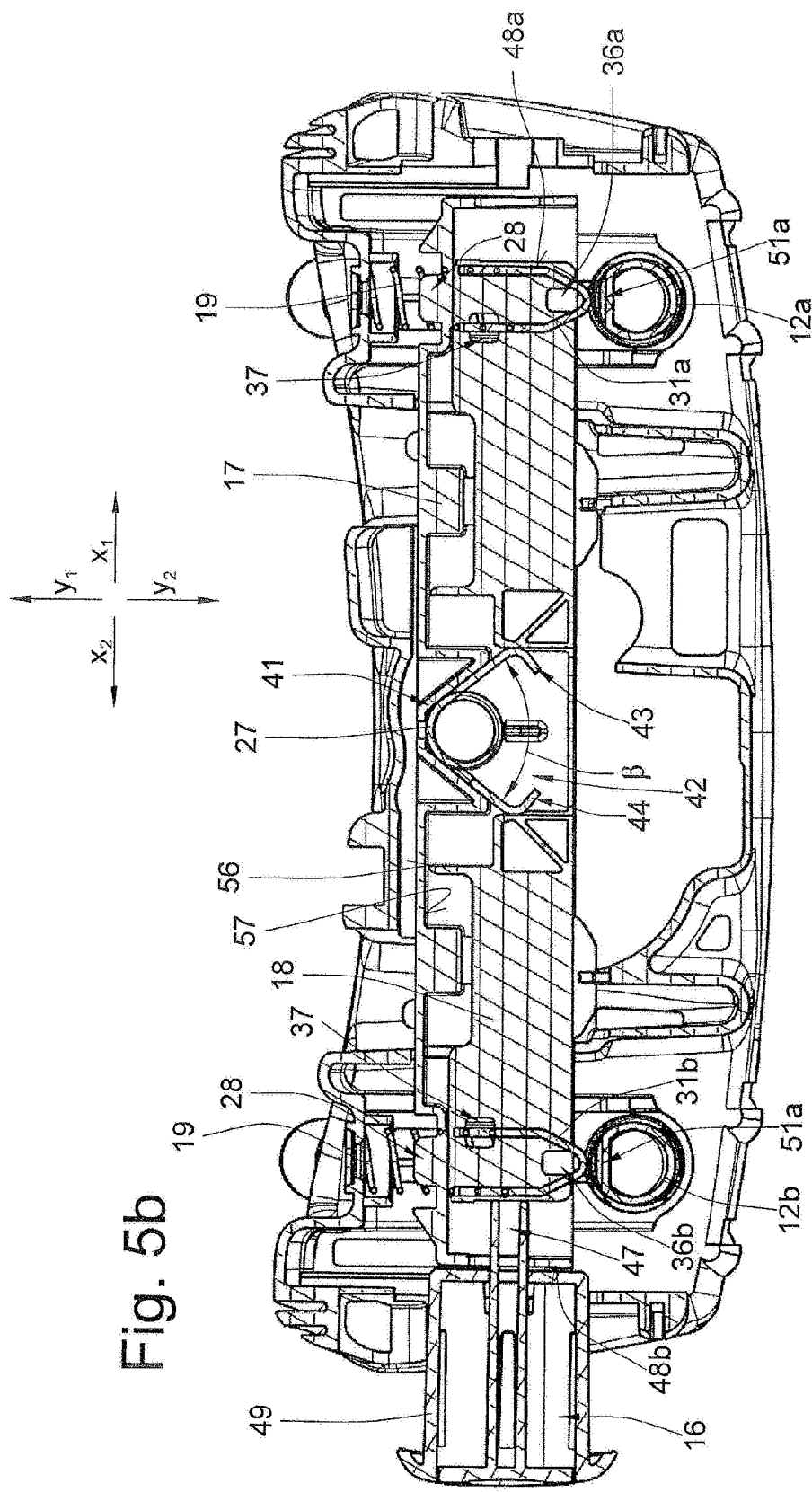
FIG. 5b is, based on FIG. 5a, a schematic section with the housing in the freeing position.

As mentioned, the housing 17 can be displaced from the rest position shown in FIG. 5a in the direction $y_1$ to the freeing position shown in FIG. 5b. From the freeing position according to FIG. 5b, the housing 17 can be moved in the direction $y_2$ into the rest position. The springs 19 bias the housing 17 in the direction $y_2$ against a contact face 55 of the body 11. The movement of the housing 17 from the rest position into the freeing position is controlled by contact of the latch bar 31a and 31b with an outer surface 40 of the support rods 12a and 12b. The outer surface 40 encloses the outer surface of the notches 51a, 51b, 51c, 51d, and 51e in each of the support rods 12a and 12b.

In the position of the housing 17 according to FIG. 5a, the latch bar 31a is engaged with the notch 51a of the support rod 12a and the latch bar 31b is engaged with the notch 51a of the support rod 12b. When the function of the headrest is explained below only with reference to the interaction of latch bar 31b with the support rod 12b, one notes that the latch bar 31a interacts with the support rod 12a in the same manner.

When the latch bars 31a and 31b come in contact with a section of the outer surface 40 that exerts a force in the direction $y_1$ on the slide 18, this force is transmitted via a rear outer surface 56 that is in contact with the outer surface 57 of the housing 17 directly to the housing 17.

In FIG. 5b, the housing 17 is in the rear position in which the latch bars 31a and 31b are moved relative to the front position of the housing 17 in the direction $y_1$ out of engagement with the notch 51a.

Figure 6:
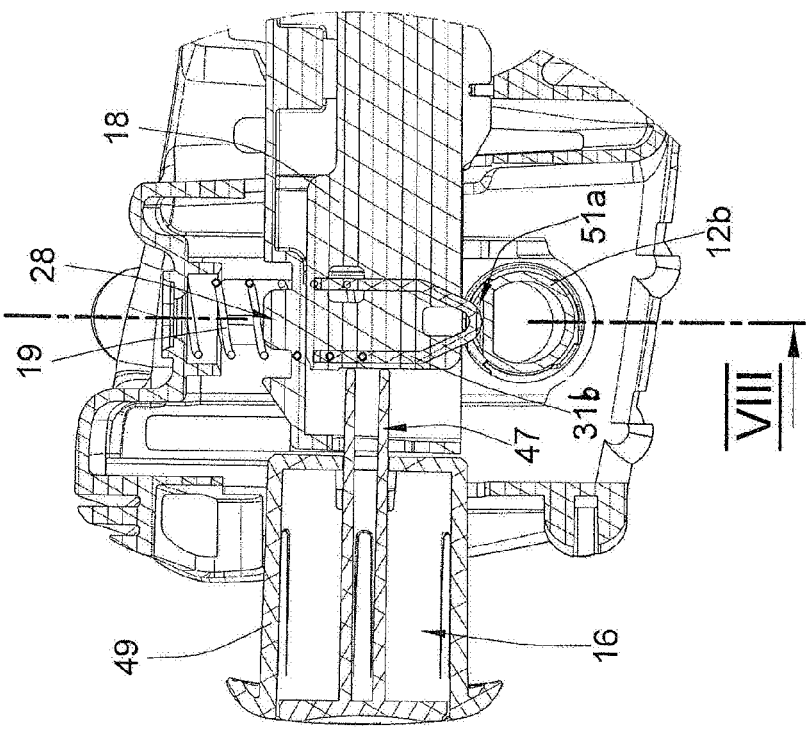
FIG. 6 is a magnified view of the section according to section line VI in FIG. 5a with the slide in the rest position.

FIG. 6 shows an enlarged section of the headrest 10 in which the wherein actuator 16 is not actuated. The slide 18 is in the rest position and the housing 17 is in the front rest position. The latch bars 31a and 31b are in engagement with the notches 51a.

Figure 7:
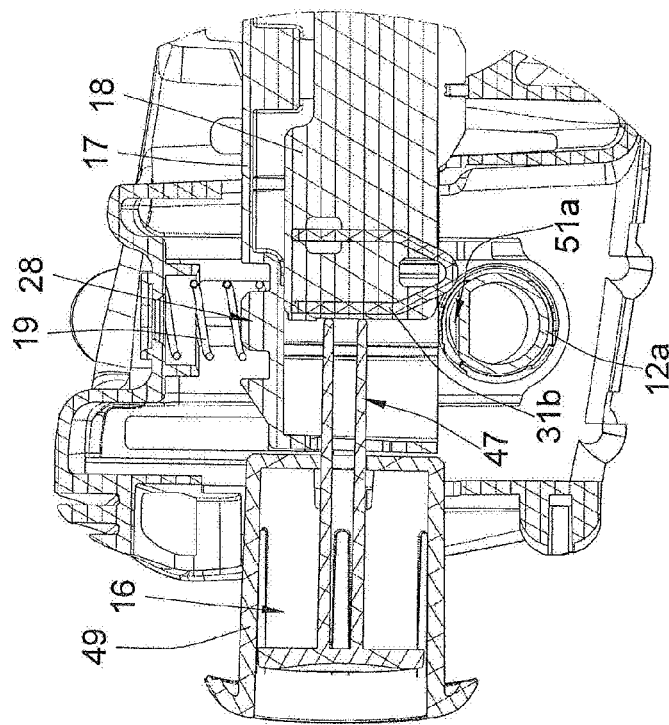
FIG. 7 shows, based on FIG. 6, the slide in the freeing position.

FIG. 7 shows the actuator 16 in the actuated position, the slide 18 in the freeing position, and the housing 17 in the rest position. The latch bars 31a and 31b are not engaged in one of the notches 51a to 51e. In the freeing position, the slide 18 is biased by the spring 27 into the rest position.

Figure 8:
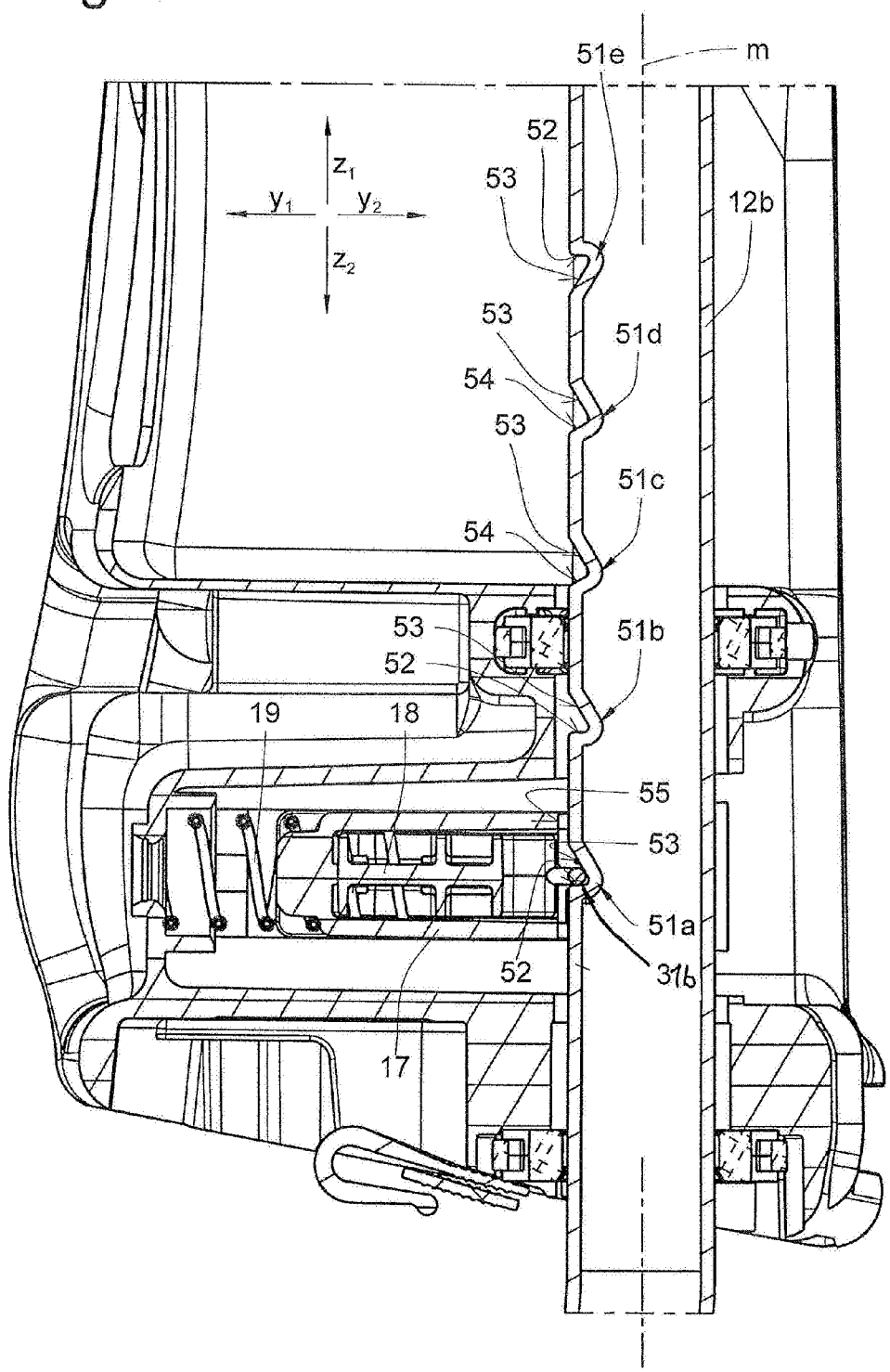
FIG. 8 is a schematic sectional view according to section plane VIII-VIII in FIG. 6.

FIG. 8 shows support rod 12b with notches 51a to 51e. Latch bar 31b is in engagement with notch 51a. This is the case when the body 11 is in the lowermost position. For example, the notch 51a has a blocking flank 52 that is constructed approximately parallel to movement the directions $y_1$, $y_2$ of the housing 17. For example, the notch 51c has control flanks 53 and 54 that are inclined to a center axis in the respective support rod 12a and 12b and thus also to the y-axis. The control flank 53 forms an angle $\alpha_1$ to a center axis m and control flank 54 forms an angle $\alpha_2$ to the center axis m. The angle $\alpha_1$ is about 30° and angle $\alpha_2$ is about 45°.

Figure 9:
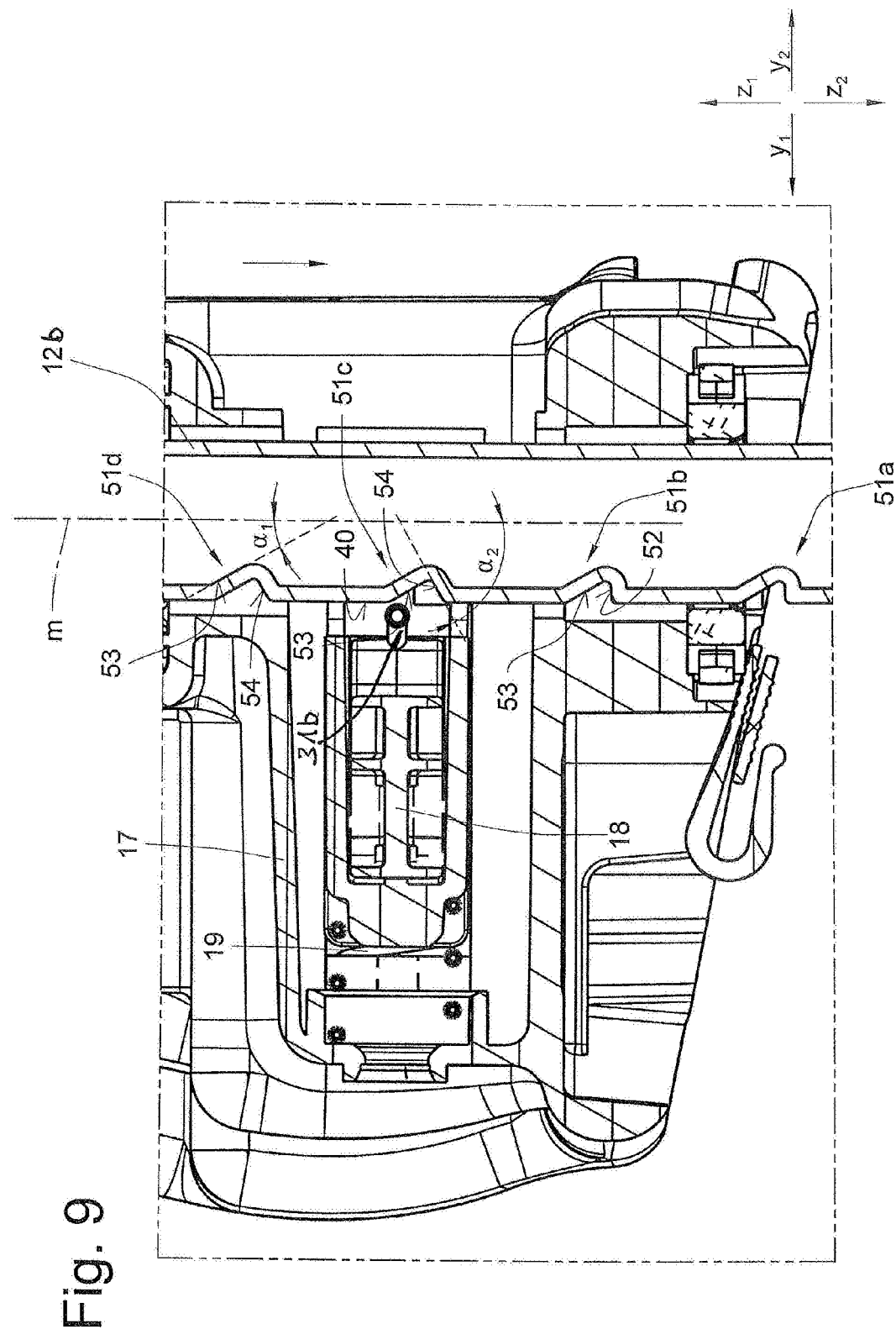
FIG. 9 shows, based on FIG. 8, a section in which the body is at another position and the latch bar is engaged with an external surface of the support rod between two latch notches.

When the body 11 is forced out of the position shown in FIG. 8 in the direction $z_1$, the latch bar 31b engages the control flank 53. Due to the contact with the control flank 53, a force is transmitted via the slide 18 in the direction $y_1$ to the housing 17. The housing 17 and the slide 18 are moved because of this force against the spring force of the springs 19 out of the rest position of the housing 17 according to FIG. 5a in the direction $y_1$ into the freeing position of the housing 17 according to FIGS. 5b and 9. The latch bars 31a and 31b thus move out of notches 51a.

Figure 10:
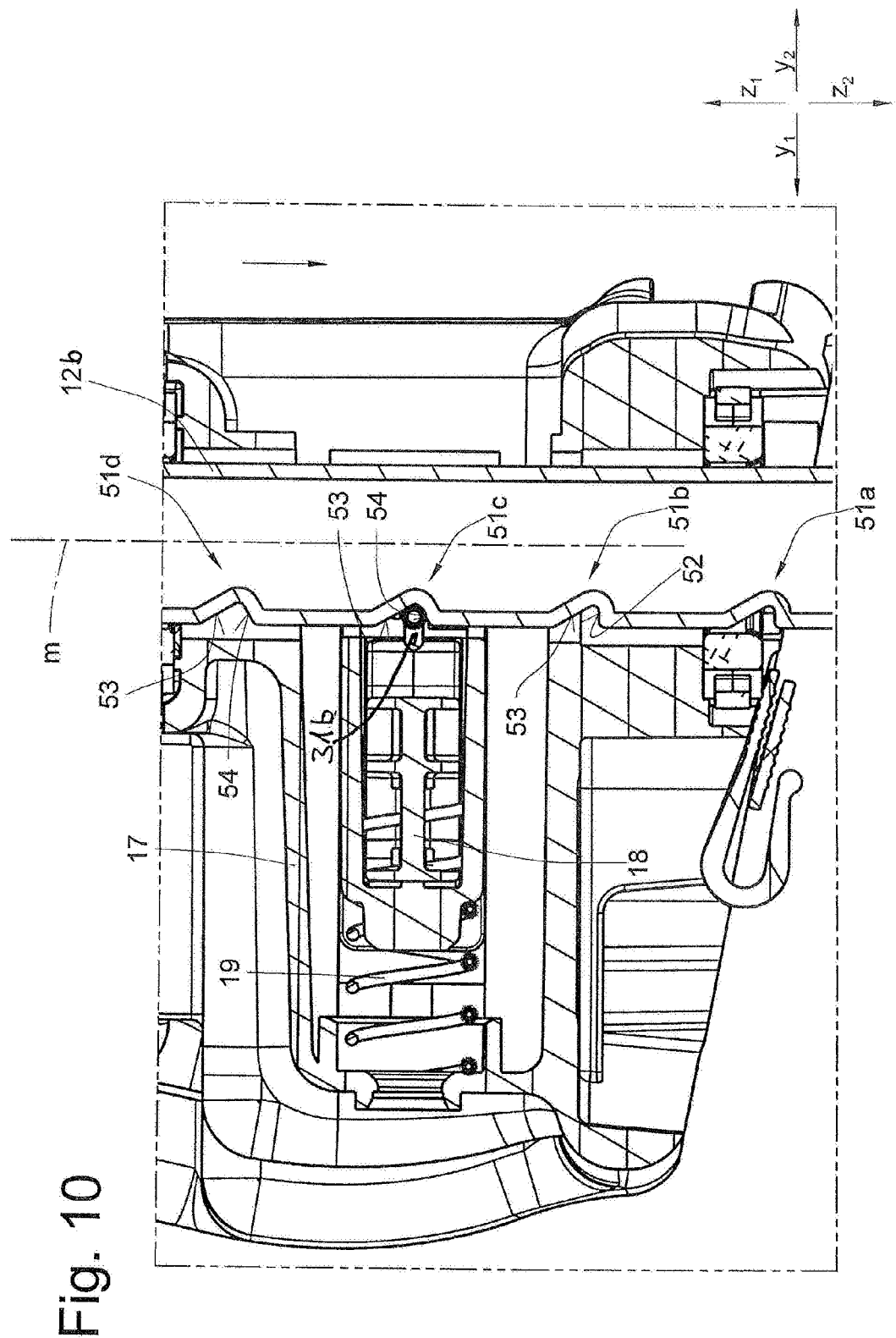
FIG. 10 shows, based on FIG. 8, a schematic section in which the body is at another height and the latch bar engages in another notch.

The body 11 can thus be moved in the direction $z_1$ without actuating the latch assembly 14. Since the housing 17 is biased in the direction $y_2$ by the springs 19, the latch bar 31a lies against the outer surface 40 of the support rod 12 (see FIG. 9) until the respective latch bar 31a and 31b automatically engages into the next notch 51b displaced in the direction $z_1$ (see FIG. 10).

If the body 11 is forced in the direction $z_2$ out of the position shown in FIG. 8, the latch bar 31b engages the blocking flank 52. This contact does not cause any force component acting in the direction $y_1$. The latch assembly 14 thus prevents movement until the slide 18 is moved by the actuator 16 out of the rest position into the freeing position according to FIG. 7 in which the latch bar 31b is moved out of notch 51a. Only when the slide 18 is in the freeing position is a movement of the body 11 in direction $z_2$ possible. The notch 51b is shaped the as the notch 51a. It also enables the body 11 to be moved without moving the actuator 16 against a resistance upward in the direction $z_1$. However, movement in the direction $z_2$ is only possible by displacing the slide 18 out of the rest position in the direction $x_1$ into the freeing position.

The notch 51c has a control flank 53 and an additional control flank 54. When the latch bar 31b is in the notch 51c, the body 11 can thus be displaced in the direction $z_1$ as well as in the direction $z_2$ without actuating the slide 18 into the freeing position. However, because the control flank 54 is inclined more than the control flank 53, movement of the body 11 out of the notch 51c in the direction $z_2$ requires a greater force than the movement in the direction $z_1$. The notch 51d is constructed the as the notch 51c.

The notch 51e has a blocking flank 52 and a control flank 53. If the latch bar 31b is in the notch 51e, movement in the direction $z_1$ is only possible by movement of the slide in the direction $x_1$. A movement in the direction $z_2$ can occur by overcoming a resistance without displacing the slide 18 out of the rest position.

If the body 11 is in the uppermost position, the latch bar 31b is engaged in the notch 51e. When the body 11 collides for example with the roof liner, a force is exerted in the direction $z_2$ on the body 11 that also causes a force in the direction $y_1$ via the control flank 53. Since the control flank 53 transfers a substantial force component in direction $y_1$, a relatively small force is sufficient to displace the housing 17 in the direction $y_1$ against the spring force of springs 19 so that the body can move in the direction $z_2$. In this way, damage to the body 11 or to the roof liner is prevented.

The invention claimed is:

1. A motor-vehicle headrest with a body, at least one support rod mounted on a vehicle seat back and secured in at least one mount fixed in the seat back or in the body, and at least one latch assembly that can releasably fix the support rod in the mount, the latch assembly having at least one notch formed in the support rod and at least one latch bar in the mount, the latch bar being forcibly movable when actuated between a first position and a second position, wherein the latch bar is movable between the first and a third position and being out of engagement with the notch in the second and third positions.

2. A motor-vehicle seat with a headrest according to claim 1.

3. The headrest according to claim 1, wherein the notch has at least one blocking flank that extends generally perpendicular to a center axis of the support rod.

4. The headrest according to claim 3, wherein the notch has at least one control flank that forms an angle between 30° and 70° with the center axis.

5. The headrest according to claim 1, wherein the latch bar moves along a first travel path between the first and second position and along a second travel path between the first and third positions in which the latch bar is disengaged from the notch even when the actuator is not active.

6. The headrest according to claim 5, wherein the latch bar moves along a first axis when moving along the first travel path and along a second axis when moving along the second travel path.

7. The headrest according to claim 6, wherein the first axis is perpendicular to the second axis.

8. The headrest according to claim 1, wherein the latch bar is juxtaposed with a slide that can move between a rest position and a freeing position and that the slide moves with the latch bar between the first and second positions.

9. The headrest according to claim 8, wherein the slide is mounted in a housing.

10. The headrest according to claim 9, wherein the housing is movable between a rest position and a freeing position and that the latch bar is movable by the housing between the first and the third positions.

11. The headrest according to claim 9, wherein the housing has at least one contact surface that is engageable with a contact surface of the body in order to define the first and/or third position of the latch bar.

12. A vehicle headrest comprising:
at least one generally vertical support rod formed with a vertical row of horizontally open notches;
a body vertically slidable along the rod;
a latch element shiftable in the body between a first position engaged in one of the notches and impeding sliding of the body along the rod, a second position offset in one direction from the rod and a third position offset in another direction from the rod.

13. The vehicle headrest defined in claim 12, wherein the latch element travels in a first straight line from the first position to the second position and in a second straight line nonparallel to the first straight line from the first position to the third position.

14. The vehicle headrest defined in claim 13, wherein the first and second lines are generally perpendicular.

15. The vehicle headrest defined in claim 14, wherein the second line extends radially of the support rod.

16. The vehicle headrest defined in claim 15, wherein the first line extends tangentially of an outer cylindrical surface of the support rod and lies in a plane perpendicular to an axis of the support rod.

17. The vehicle headrest defined in claim 14, wherein the latch element is a slide and includes an elongated housing extending and movable parallel to the first line in the body and the slide is movable transversely of the housing along the second line in the housing.

18. The vehicle headrest defined in claim 17, further comprising:
at least one spring braced between the slide and the housing and urging the slide parallel to the second line out of the housing.

19. The vehicle headrest defined in claim 18, wherein the slide and the housing are both generally parallepipedal and the slide is only moveable parallel to the second line relative to the housing and the housing is only movable parallel to the first line relative to the body.

20. The vehicle headrest defined in claim 19, wherein the housing forms an abutment on which the slide bears directly parallel to the second line in the third position.

* * * * *